United States Patent
Mather et al.

(10) Patent No.: US 7,371,799 B2
(45) Date of Patent: May 13, 2008

(54) BLENDS OF AMORPHOUS AND SEMICRYSTALLINE POLYMERS HAVING SHAPE MEMORY PROPERTIES

(75) Inventors: Patrick T. Mather, Chagrin Falls, OH (US); Changdeng Liu, Storrs, CT (US); Cheryl J. Campo, Cleveland Heights, OH (US)

(73) Assignee: University of Connecticut, Farmington, CT (US)

( * ) Notice: Subject to any disclaimer, the term of this patent is extended or adjusted under 35 U.S.C. 154(b) by 0 days.

(21) Appl. No.: 11/624,952

(22) Filed: Jan. 19, 2007

(65) Prior Publication Data

US 2007/0135578 A1 Jun. 14, 2007

Related U.S. Application Data

(62) Division of application No. 10/683,558, filed on Oct. 10, 2003, now Pat. No. 7,208,550.

(60) Provisional application No. 60/418,023, filed on Oct. 11, 2002, provisional application No. 60/466,401, filed on Apr. 29, 2003, provisional application No. 60/488,323, filed on Jul. 18, 2003.

(51) Int. Cl.
*C08L 23/04* (2006.01)
*C08L 27/04* (2006.01)
*C08L 27/06* (2006.01)
*C08L 27/16* (2006.01)
*C08L 33/04* (2006.01)
*C08L 33/10* (2006.01)
*C08L 35/02* (2006.01)

(52) U.S. Cl. ............... 525/199; 525/222; 525/239; 525/240

(58) Field of Classification Search ........... 525/199, 525/222, 239, 240
See application file for complete search history.

(56) References Cited

U.S. PATENT DOCUMENTS

| | | | |
|---|---|---|---|
| 3,383,336 A | 5/1968 | Kuyama et al. |
| 3,459,725 A | 8/1969 | Natta et al. |
| 3,563,973 A | 2/1971 | Arditti et al. |
| 4,080,357 A | 3/1978 | Gergen et al. |
| 4,612,241 A | 9/1986 | Howard, Jr. |
| 5,145,935 A | 9/1992 | Hayashi |
| 5,147,385 A | 9/1992 | Beck et al. |
| 5,163,952 A | 11/1992 | Froix |
| 5,189,110 A | 2/1993 | Ikematu et al. |
| 5,258,020 A | 11/1993 | Froix |
| 5,282,854 A | 2/1994 | Yagi et al. |
| 5,395,882 A | 3/1995 | Siol et al. |
| 5,506,300 A | 4/1996 | Ward et al. |
| 5,607,467 A | 3/1997 | Froix |
| 5,665,822 A | 9/1997 | Bitler et al. |
| 5,674,242 A | 10/1997 | Phan et al. |
| 5,769,883 A | 6/1998 | Buscemi et al. |
| 5,880,240 A | 3/1999 | Tsuno |
| 5,889,118 A | 3/1999 | Delgado et al. |
| 5,908,918 A | 6/1999 | Chen et al. |
| 5,910,357 A | 6/1999 | Hachisuka et al. |
| 5,954,744 A | 9/1999 | Phan et al. |
| 5,955,559 A | 9/1999 | Handlin, Jr. et al. |
| 5,964,744 A | 10/1999 | Balbierz et al. |
| 6,024,764 A | 2/2000 | Schroeppel |
| 6,086,204 A | 7/2000 | Magnante |
| 6,156,842 A | 12/2000 | Hoenig et al. |
| 6,160,084 A | 12/2000 | Langer et al. |
| 6,183,248 B1 | 2/2001 | Chishti et al. |
| 6,217,609 B1 | 4/2001 | Haverkost |
| 6,248,129 B1 | 6/2001 | Froix |
| 6,281,262 B1 * | 8/2001 | Shikinami ............ 523/105 |
| 6,368,346 B1 | 4/2002 | Jadhav |
| 6,388,043 B1 | 5/2002 | Langer et al. |
| 6,395,038 B1 | 5/2002 | Schroeppel |
| 6,427,738 B1 | 8/2002 | Fujino et al. |
| 6,530,950 B1 | 3/2003 | Alvarado et al. |
| 6,538,089 B1 | 3/2003 | Samra et al. |
| 6,596,818 B1 | 7/2003 | Zamore |
| 6,679,605 B2 | 1/2004 | Zhou et al. |
| 6,720,402 B2 | 4/2004 | Langer et al. |
| 6,852,825 B2 | 2/2005 | Lendlein et al. |

(Continued)

FOREIGN PATENT DOCUMENTS

EP 0 343 442 5/1989

(Continued)

OTHER PUBLICATIONS

JP 11154420 Abstract Only; Jun. 8, 1999 (1 page).

(Continued)

*Primary Examiner*—Nathan M. Nutter
(74) *Attorney, Agent, or Firm*—Cantor Colburn LLP

(57) ABSTRACT

Blends of amorphous and semicrystalline polymers having shape memory properties were prepared by blending a crystalline polymer such as poly(vinylidene fluoride), polylactide, poly(hydroxxybutyrate), poly(ethylene glycol) polyethylene, polyethylene-co-vinyl acetate, poly(vinyl chloride), poly(vinylidene chloride) and copolymers of poly (vinylidene chloride) and poly(vinyle chloride) and an amorphous polymer such as poly(vinyl acetate), poly methyl acrylate, poly ethyl acrylate, atactic poly methyl methacrylate, isotactic poly methyl methacrylate, syndiotactic poly methyl methacrylate and other poly alkyl methacrylates. The method for preparing the polymeric materials and applications thereof, for example, as smart medical devices, are also disclosed.

4 Claims, 3 Drawing Sheets

U.S. PATENT DOCUMENTS

| | | |
|---|---|---|
| 6,858,680 B2 | 2/2005 | Gunatillake et al. |
| 2001/0004708 A1 | 6/2001 | Nagai |
| 2002/0007222 A1 | 1/2002 | Desai |
| 2002/0015519 A1 | 2/2002 | Tokas et al. |
| 2002/0137864 A1 | 9/2002 | Tong |
| 2003/0060530 A1 | 3/2003 | Topolkaraev et al. |
| 2003/0060793 A1 | 3/2003 | Topolkaraev et al. |
| 2003/0147046 A1 | 8/2003 | Shadduck |
| 2003/0191276 A1 | 10/2003 | Lendlein et al. |
| 2004/0014929 A1 | 1/2004 | Lendlein et al. |
| 2004/0015187 A1 | 1/2004 | Lendlein et al. |
| 2004/0015261 A1 | 1/2004 | Hofmann et al. |
| 2004/0024143 A1 | 2/2004 | Lendlein et al. |
| 2004/0030062 A1 | 2/2004 | Mather et al. |
| 2004/0116641 A1 | 6/2004 | Mather et al. |
| 2004/0122184 A1 | 6/2004 | Mather et al. |
| 2004/0262814 A1* | 12/2004 | Beer et al. ............. 264/331.15 |
| 2005/0010275 A1 | 1/2005 | Sahatjian et al. |
| 2005/0216074 A1 | 9/2005 | Sahatjian et al. |
| 2005/0245719 A1 | 11/2005 | Mather et al. |

FOREIGN PATENT DOCUMENTS

| | | |
|---|---|---|
| EP | 0385443 A2 | 2/1990 |
| EP | 0442693 A2 | 2/1990 |
| EP | 0368274 A2 | 5/1990 |
| EP | 0 385 443 A2 | 9/1990 |
| EP | 1 000 958 A1 | 5/2000 |
| EP | 1000958 B1 | 5/2000 |
| WO | WO 94/14890 | 7/1994 |
| WO | WO 95/26762 | 10/1995 |
| WO | WO 99/42147 | 8/1999 |
| WO | WO 99/42528 | 8/1999 |
| WO | WO 99/46327 | 9/1999 |
| WO | WO 00/10485 | 3/2000 |
| WO | WO 00/71554 | 11/2000 |
| WO | WO 01/07499 | 2/2001 |
| WO | WO 01/91822 | 12/2001 |
| WO | WO 02/39875 | 5/2002 |
| WO | WO 02/059170 | 8/2002 |
| WO | WO 02/083786 | 10/2002 |
| WO | WO 03/084490 | 10/2003 |
| WO | WO 03/084491 | 10/2003 |
| WO | WO 03/088818 | 10/2003 |
| WO | WO 03/093341 | 11/2003 |
| WO | WO 2004/006885 | 1/2004 |
| WO | WO 2004/011525 | 2/2004 |
| WO | WO 2004/032799 | 4/2004 |
| WO | WO 2004/033515 | 4/2004 |
| WO | WO 2004/033539 | 4/2004 |
| WO | WO 2004/033553 | 4/2004 |
| WO | WO 2005/009523 | 2/2005 |

OTHER PUBLICATIONS

JP 11302493 Abstract Only; Nov. 2, 1999 (1 page).
JP 2232212 Abstract Only; Sep. 14, 1990 (1 page).
JP 2258817 Abstract Only; Oct. 19, 1990 (1 page).
JP 02274526 Abstract Only; Nov. 8, 1990 (1 page).
JP 62192440 Abstract Only; Aug. 24, 1987 (1 page).
JP 3068610 Abstract Only; Mar. 25, 1991 (1 page).
JP 3068611 Abstract Only; Mar. 25, 1991 (1 page).
JP 4100831 Abstract Only; Apr. 2, 1992 (1 page).
JP 63145325 Abstract Only; Jun. 17, 1988 (1 page).
JP 63179955 Abstract Only; Jul. 23, 1988 (1 page).
JP 8301952 Abstract Only; Nov. 19, 1986 (1 page).
JP 9235329 Abstract Only; Sep. 9, 1997 (1 page).
JP 2000319423 Abstract Only; Nov. 21, 2000 (1 page).
Lendlein et al., Biodegradable, Elastic Shape-Memory Polymers for Potential Biomedical Applications, Science (2002) 296, pp. 1673-1676.
Nakayama, K., "Properties and Applications of Shape-Memory Polymers", International Polymer Science and Technology 1991, 18, T/43-48.
Irie, M., Shape Memory Polymers, Cambridge University Press: Cambridge, UK 1998, pp. 203-219.
Boochathum et al., Vulcanization of Cis- and Trans-Polyisoprene and Their Blends: Crystallization Characteristics and Properties, European Polymer Journal, 37 (2001) pp. 429-434.
Boochathum et al., "Vulcanization of Cis- and Trans-Polyisoprene and Their Blends: Cure Characteristics and Crosslink Distribution", European Polymer Journal 37 (2001) pp. 417-427.
Schwab et al., "Synthesis and Applications of $RuCl_2(=CHR')(PR_3)_2$: The Influence of the Alkylidene Moiety on Metathosis Activity", J. Am. Chem. Soc. (1996) 118, pp. 100-110.
Bielawski et al., "Highly Efficient Ring-Opening Metathesis Polymerization (ROMP) Using New Ruthenium Catalysts Containing N-Heterocyclic Carbene Ligands", Angew. Chem. Int. Ed. (2000) 39, No. 16, pp. 2903-2906.
Calderon et al., "Melting Temperature of trans-Polyoctenamer", Journal of Polymer Science: *Part A-2*, vol. 5, (1967), pp. 1283-1292.
Natta et al., "The Monoclinic Structure of Even trans-Polyalkenamers", European Polymer Journal, vol. 3 (1967) pp. 339-352.
Bassi et al., "The Triclinic Structure of trans-Polyoctenamer", European Polymer Journal, vol. 4, (1968), pp. 123-132.
Schneider et al., "Crystallinity of trans-Polyoctenamer: Characterization and Influence of Sample History", Journal of Molecular Catalysis, 46 (1988), pp. 395-403.
Yeh et al., "Radiation-Induced Crosslinking: Effect on Structure of Polyethylene", Colloid & Polymer Sci. 263 (1985), pp. 109-115.
Liu, et al.: "Chemically Cross-Linked Polycyclooctene: Synthesis, Characterization and Shape Memory Behaviour" Macromolecules, vol. 35, No. 27, 31 (Dec. 31, 2002) XP002273474.
Dinger, et al.; "High Turnover Numbers with Ruthenium-Based Metathosis Catalysts", Advanced Synthesis Cataylsis, vol. 344, (Aug. 2002) pp. 617-677, XP002273581 p. 673, left-hand column; table 1.
Oh et al., "Dynamic Mechanical Properties of Carbon Black Filled Trans-polyoctenamer Vulcanizates" (Oct. 19, 1985) Abstract Only, 1 page.
Fu et al., "Structural Development During Deformation of Polyurethane Containing Polyhedral Oligomeric Silsesquioxanes (POSS) Molecules", Polymer 42 (2001) pp. 599-611.
Du Prez, F. E. et al., "Segmented Networks by Catlonic Polymerization: Design and Applications" NATO Sci. Ser., Ser. E, (1999), pp. 75-98.
Fu et al., "Nanoscale Reinforcement of Polyhedral Oligomeric Silsesqulroxane (POSS) In Polyurethane Elastomer", Polymer Int. 49 (2000) pp. 437-440.
Qing Ge and Patrick T. Mather, "Synthesis of Thermoplastic Polyurethanes Bearing Nanostructured Hard Segments: New Shape Memory Polymers" Polymer Program, Institute of Materials Science and Department of Engineering, UCONN, (Jul. 2003), (Abstract, 2 pages).
Goethals et al. "Poly(Vinyl Ethers) as Building Blocks for New Materials" Macromol. Symp., (1998), 132, pp. 57-64.
Kagami et al., "Shape Memory Behaviors of Crosslinked Copolymers Containing Stearyl Acrylate" Macromol. Rapid. Commun., (1996), 17(8), pp. 539-543.
Kaneko et al., "Shape Memory Gels with Multi-Stimuli-Responses", Proc. SPIE-Int. Soc. Opt. Eng., (1999) 3669, pp. 199-208.
Reyntjens et al., "Polymer Networks Containing Crystallizable Poly(octadecyl vinyl ether) Segments for Shape-Memory Materials", Macromol. Rapid. Commun., (1999), 20(5), pp. 251-255.
H. G. Jeon et al., "Shape Memory and Nanostructure in Poly(norbornyl-POSS) Copolymers", Polymer International, 49, (2000), pp. 453-457.
P. T. Mather et al., "Strain Recovery in Drawn POSS Hybrid Thermoplastics," XIIIth International Congress on Rheology, Cambridge, UK (2000), 4, pp. 53-55.
P. T. Mather et al., "Strain Recovery in POSS Hybrid Thermoplastics," Polymer Preprints 41(1), (2000), pp. 528-529.

Lendlein et al., "AB-Polymer Networks Based on Oligo(ε-caprolactone) Segments Showing Shape-Memory Properties" Proc. Natl. Acad. Sci., USA (2001), 98(3), pp. 842-847.
Wei et al., "Shape-Memory Materials and Hybrid Composites for Smart Systems", Journal of Materials Science 33, (1998) pp. 3743-3762.
Van Humbeeck, "Shape Memory Alloys: A Material and a Technology", Advanced Engineering Materials, vol. 3, No. 11, (2001) pp. 837-850.
Byung Kyu Kim et al., "Polyurethane Ionomers Having Shape Memory Effects", Polymer, vol. 39, No. 13 (1998), pp. 2803-2808.
Lin et al., "Study on Shape-Memory Behavior of Polyether-Based Polyurethanes. I. Influence of the Hard-Segment Content", Journal of Applied Polymer Science, vol. 69, (1998), pp. 1563-1574.
Lin et al., "Study on Shape-Memory Behavior of Polyether-Based Polyurethanes. II. Influence of Soft-Segment Molecular Weight", Journal of Applied Polymer Science, Vol. 69, (1998), pp. 1575-1586.
Chun et al., "Enhanced Dynamic Mechanical and Shape-Memory Properties of a Poly(ethylene terephthalate)-Poly(ethylene glycol) Copolymer Crosslinked by Anhydride", Journal of Applied Polymer Science, vol. 83, (2002) pp. 27-37.
Gajria et al., "Miscibility and Biodegradability of Blends of Poly(Lactic Acid) and Poly(Vinyl Acetate)", Polymer, vol. 37, (1996), pp. 437-444.
Ishii, M. "Shape Memory Resins", Trans-polyisoprene-based Shape Memory Resins, Zairyo Gijutsu (1989), 7(6), Abstract Only, 1 page.
Lendlein, Andreas and Steffen Kelch, "Shape-Memory Polymers", Angew. Chem. Int. Ed. 41, (2002), pp. 2034-2057.
Yoshida et al., "Development and Application of Shape-Memory Polymer Gel (Part I)-Synthesis and Processing of Shape-Memory Polymer Gel", Hokkaidoritsu Kogyo Shikenjo Hokoku (1999), 298 Abstract Only, 1 page.
"Silsesquioxanes, Bridging the Gap Between Polymers & Ceramics" ChemFiles vol. 1, No. 6 (2001) (14 pgs).
Ingrid A. Rousseau and Patrick T. Malher, "Shape Memory Effect Exhibited by Smectic-C Liquid Crystalline Elastomers" J. Am. Chem. Soc., 125, (2003), pp. 15300-15301.
Liu et al., "Shape Memory of Hydrogen-Bonded Polymer Network/Poly(ethylene glycol) Complexes", Chengdu Institute of Organic Chemistry, Chinese Academy of Sciences, Dec. 30, 2003 (6 pages).
Jeong et al., "Miscibility and Shape Memory Property of Poly(vinyl chloride)/Thermoplastic Polyurethane Blends", Journal of Materials Science 36 (2001) 5457-5463.
Jeong et al., "Miscibility and Shape Memory Effect of Thermoplastic Polyurethane Blends with Phenoxy Resin", European Polymer Journal 37 (2001) 2245-2252.
Zhu, G. et al., "Shape-Memory Effects of Radiation Crosslinked Poly(ε-caprolactone)", Journal of Applied Polymer Science, vol. 90, 1589-1595 (2003).
Ramanathan et al., "Polyurethane Urea", Polymer Data Handbook, New York: Oxford University Press (1999), pp. 878-881.
Ramanathan et al., "Polyurethane Elastomers", Polymer Data Handbook, New York: Oxford University Press (1999), pp. 874-877.
Ramanathan et al., "Polyurethane", Polymer Data Handbook, New York: Oxford University Press (1999), pp. 870-873.
Sung et al., "Properties of Segmented Poly(urethaneureas) Based on 2,4-Toluene Diisocyanate. 1. Thermal Transitions, X-ray Studies, and Comparison with Segmented Poly(urethanes)", Macromolecures, 13, (1980), pp. 111-116.
Gupta et al., "Effect of Solvent Exposure on the Properties of Hydroxy-Terminated Polybuladiene-Based Polyurethanes", Polym Int, 52, (2003), pp. 938-948.
Bielawski et al., "Highly Efficient Syntheses of Acetoxy- and Hydroxy-Terminated Telechelic Poly(butadlene)s Using Ruthenium Catalysis Containing N-heterocyclic Ligands", Polymer, 42, (2001), pp. 4939-4945.
Sarbu et al., "Synthesis of Hydroxy-Telechelic Poly(methyl acrylate) and Polystyrene by Atom Transfer Radical Coupling", Macromolecules, 37, (2004), pp. 9694-9700.
Mauler et al., Liquid-Crystalline Polyacrylate Crosslinked with α, ω Polyisoprene Diacrylate Segments, Polymer Bulletin, 41, (1998) pp. 291-297.
Sartomer Product Bulletin, "Hydroxyl Terminated Polybutadiene Resins and Derivatives-Poly bd and Krasol" Sep. 2004, 40 pages.
Wache et al., "Development of a Polymer Stent with Shape Memory Effect as a Drug Delivery System", Journal of Materials Science: Materials In Medicine, 14, (2003). pp. 109-112.
Valimaa et al., "Viscoelastic Memory and Self-Expansion of Self-Reinforced Bioabsorbable Stents", Biomaterials, 23, (2002), pp. 3575-3582.
"Suite of Shape-Memory Polymers", Chemical & Engineering, Feb. 5, 2001, 1 page.
Woojin Lee, "Polymer Gel Based Actuator: Dynamic Model of Gel for Real Time Control", Massachusetts Institute of Technology, Department of Mechanical Engineering, May 1996, 120 pages.
Gordon, "Applications of Shape Memory Polyurethanes", Proceedings of the First International Conference on Shape Memory and Superelastic Technologies, SMST International Committee, (1994), pp. 115-199.
WO03035753 Abstract Only; May 1, 2003 (1 page).
XP002274198; JP1231051A Abstract Only; Oct. 15, 1986 (1 page).
Liu et al., "Thermomechanical Characterization of a Novel Series of Shape Memory Polymers", SPE ANTEC Proceedings, (2002) 5 pages.
WO9746633 Abstract Only; Dec. 11, 1997 (1 page).
WO0046262 Abstract Only; Aug. 10, 2000 (1 page).
WO03084491 Abstract Only; Oct. 16, 2003 (1 page).
WO03084490 Abstract Only; Oct. 16, 2003 (1 page).
WO2004006885 Abstract Only; Jan. 22, 2004 (1 page).
International Search Report; International Application No. PCT/US 03/32059; Mailing Date: Apr. 21, 2004 (2 pages).
International Search Report; International Application No. PCT/US 03/32308; Mailing Date: Jun. 3, 2004 (2 pages).
International Search Report; International Application No. PCT/US 03/32329; Mailing Date: Apr. 1, 2004 (2 pages).
International Search Report; International Application No. PCT/US 03/32138; Mailing Date: Mar. 31, 2004 (2 pages).
WO03035743; May, 1, 2003; Method for Reducing the Toughness of Shaped Plastic Parts to be Mechanically Worked and the Use Thereof; Abstract Only (1 page).
JP02-255830; Oct. 16, 1990; Shape Memory Crosslinked Molding and its Production; Abstract Only (1 page).
Lendlein et al. "Biodegradable, Elastic Shape-Memory Polymers for Potential Biomedical Applications", Science, vol. 296, May 31, 2002, pp. 1673-1676.

* cited by examiner

Glass transition temperatures measured following quenching of the PLA/PVAc blends (solid points). Solid line is best fit to the Fox equation, $1/T_g = w_a/T_g^a + w_b/T_g^b$.

Tensile storage modulus versus temperature for a range of PLA/PVAc blends whose composition is indicated in the plot.

Shape recovery of coiled PLA/PVAc (30:70) blend on exposure to water at T = 65 °C. Sample thickness is 0.5 mm.

BLENDS OF AMORPHOUS AND SEMICRYSTALLINE POLYMERS HAVING SHAPE MEMORY PROPERTIES

CROSS-REFERENCE TO RELATED APPLICATIONS

This application is a division of and claims the priority of U.S. patent application Ser. No. 10/683,558, filed Oct. 10, 2003, and now U.S. Pat. No. 7,208,550, which in turn claims the priority of the following provisional patent applications: Ser. No. 60/418,023, filed Oct. 11, 2002; Ser. No. 60/466, 401, filed Apr. 29, 2003; and Ser. No. 60/488,323, filed Jul. 18, 2003. Each of the foregoing patent applications is incorporated herein by reference to the extent not inconsistent with the present disclosure.

TECHNICAL FIELD

The present disclosure relates to shape memory materials and, more particularly, to blends of an amorphous polymer, such as poly(vinyl acetate) (PVAc), and a semicrystalline polymer, which can be for example poly(lactic acid) (PLA) or poly(vinylidene fluoride) (PVDF). The present disclosure also relates to methods for the preparation of such blends demonstrating shape memory effects and to applications thereof.

BACKGROUND OF THE DISCLOSURE

Shape memory materials feature an ability to transform shape from a temporary, frozen, shape to a permanent shape when triggered by an environmental stimulus, such as heat, light, or vapor. Used creatively, this phenomena can be exploited for a wide range of applications. Many polymers intrinsically show shape memory effects, e.g., on the basis of rubber elasticity, combined with vitrification or crystallization but with varying characteristics such as strain recovery rate, work capability during recovery, and retracted state stability. Among the first shape memory polymers (SMPs) reported as such was crosslinked polyethylene, which was discovered and patented in 1971 by Radiation Appliances, Inc., and a methacrylic acid ester reported by the Vemon-Benshoff Co. for use as a denture material. The mechanism of strain recovery for such a material was identified as being far different from that of shape memory alloys (SMAs), which are based largely on nickel-titanium alloys.

More particularly, a shape memory polymer is a superelastic rubber; when the polymer is heated to a rubbery state, it can be deformed under resistance of ~1 Mpa modulus, and when the temperature is decreased below either a crystallization temperature or a glass transition temperature, the deformed shape is fixed by the lower temperature rigidity while, at the same time, the mechanical energy expended on the material during deformation is stored. Thereafter, when the temperature is raised above the transition temperature ($T_n$ or $T_g$), the polymer will recover to its original form as driven by the restoration of network chain conformational entropy. The properties of the SMPs will be closely linked to the network architecture and to the sharpness of the transition separating the rigid and rubber states. Compared with SMAs, SMPs have an advantage of (i) high strain, to several hundred percent because of the large rubbery compliance while the maximum strain of a SMA is less than 8%. (ii) facile tuning of transition temperatures through variation of the polymer chemistry; and (iii) processing ease at low cost.

A concurrently filed application for patent filed by inventors herein discloses the synthesis and characterization of thermally stimulated SMPs having different thermomechanical properties and their use in various applications, including as medical devices and mechanical actuators. The disclosed materials span a range of room temperature moduli, from rigid glassy materials having storage moduli of several GPa to compliant rubbers with moduli as low as tens of MPa. Moreover, the retracting (rubbery) moduli have been tuned over the range 0.5<E<10 MPa, as dictated by the end application. One example of such an SMP is chemically crosslinked polycyclooctene (PCO), a stiff semicrystalline rubber that is elastically deformed above $T_m$ to a temporary shape that is fixed by crystallization. Fast and complete recovery of gross deformations are achieved by immersion in hot water. Other SMPs offering tunable critical temperatures and rubber modulus have been synthesized using a thermosetting random copolymer formed from two vinyl monomers that yield controlled $T_g$ and casting-type processing. Such copolymers were crosslinked with a difunctional vinyl monomer as crosslinlker, the concentration of crosslinker controlling the rubber modulus and thus the work potential during recovery. In addition to their shape memory effects, these materials are also castable allowing for processing more complex shapes and they are optically transparent. The use of chemical crosslinking in both of these cases, however, limits the types of processing possible and permanently sets the equilibrium shape at the point of network formation.

Semicrystalline thermoplastic polymers with sharp $T_g >$ room temperature and low crystallinity are also good candidates for shape memory, while offering the advantage of melt processing above $T_m$, allowing repeated resetting of the equilibrium shape by relaxing stress in the fluid state. Representative of the polymers in this class of SMPs are polyurethanes whose soft domains are semicrystalline with low melting points (but higher than $T_m$) and whose hard domains feature a higher melting point only exceeded during processing. The effect of the hard segments and soft segments on the shape memory effects have been investigated. In addition to such polyurethanes, block copolymers of polyethylene terephthalate (PET) have been synthesized for their shape memory effects.

Miscible blends of a semicrystalline polymer with an amorphous polymer have been investigated in the past, though not with respect to shape memory behavior, due to their attractive crystalline properties and mechanical properties. For those blends that are miscible at the molecular level, a single glass transition results, without broadening, an aspect important to shape memory. Additionally, in such miscible blends the equilibrium crystallinity (which controls the plateau modulus between $T_g$ and $T_m$ where shape fixing is performed) also changes dramatically and systematically with blend composition; i.e., relative levels of each component. Although numerous blends of this type have been investigated, there has been no known disclosure of the utilization of such blends for their shape memory properties.

SUMMARY OF THE DISCLOSURE

In accordance with the present disclosure, SMPs with relatively high modulus in the fixed state at room temperature, having a tunable and sharp transition, the permanent shape of which can be remolded repeatedly above certain melting temperatures, are prepared by the blending or mixing of a crystalline polymer (C) with an amorphous polymer (A), such that they are a single miscible phase in the molten state (allowing processing to stress-free native states), but crystalline to a limited and tailored extent and which further vitrify on cooling to room temperature. Examples for (C) include, but are not limited to, poly(vinylidene fluoride) (PVDF) ($T_g$=−35° C., $T_m$=175° C.), polylactide (PLA) ($T_g$=56° C., $T_m$=165° C.),and its copolymers such as poly (L-lactide), poly (D,L-lactide, poly(lactide-co-glycolide), poly(lactide-co-caprolactone), poly(lactide-co-1,5-dioxepan-2-one), poly(lactide-co-trimethylene carbonate), polyglycolide, poly(3-hydroxy butyrate) and its copolymers, polyanhydrides, poly(ethylene glycol) (PEG), polyethylene, polyethylene-co-vinyl acetate, poly(vinyl chloride) (PVC), and poly(vinylidene chloride) (PVDC) and copolymers of vinylidene chloride and vinyl chloride. Examples for (A) include poly(vinyl acetate) (PVAc) ($T_g$=35° C.), poly(methyl acrylate) (PMA), poly(ethyl acrylate) (PEA), atactic poly(methyl methacrylate) (aPMMA), isotactic poly(methyl methacrylate) (iPMMA), syndiotactic poly(methyl methacrylate) (sPMMA), and other poly(alkyl methacrylates).

Plasticizers may be included in the disclosed blends according to the present disclosure. Exemplary plasticizers include, but are not limited to, di-n-butyl phthalate (DBP), di-n-octyl phthalate (DNOP), di(2-ethylhexyl) phthalate (DOP), di-2-ethylhexyl) isophthalate (DOIP), bis-(20ethylhexyl) terephthalate (DOTP), di-n-decyl phthalate (DNDP), di-cyclohexyl phthalate (DCHP), di-octysebacate (DOS), Hexamoll® DINCH, EVA, EVA-carbon monoxide terpolymer (Elvaloy), poly(alkylene alkanoates). DOP can also be used to decrease the glass transition of PVC.

The disclosed polymer blends may also be compounded to include a finely divided particulate material, such as clay, silica or $TiO_2$.

For high stiffness in the temporary form, a need exists for shape memory polymers having a $T_g$ greater than room temperature, but with a tailored rubber modulus and elasticity derived from physical rather than chemical crosslinks.

Preferably, exemplary SMPs of the present disclosure are achieved by blending or mixing amorphous poly (vinyl acetate) (PVAc) ($T_g$=35° C.) with semicrystalline polylactide (PLA) ($T_g$=56° C., $T_m$=165° C.) or poly (vinyldiene fluoride) (PVDF). The disclosed polymers show complete miscibility at all blending ratios with a single glass transition temperature, while crystallization (exclusive of PVAc) is partially maintained. The $T_g$'s of the blends are employed as the critical temperature for triggering the shape recovery while the crystalline phases function as physical crosslinking sites for elastic deformation above $T_g$, but below $T_m$. Shape memory polymers have received increased attention recently, prompted by an expanding range of potential end-use applications, especially for development of biomedical engineering tools and as medical devices.

Presently preferred polymer blends according to the present disclosure are formed from poly vinyl acetate(PVAC) and poly(lactic acid) (PLA) or poly(vinylidene fluoride) (PVDF). However, examples of other suitable blends include the pair PVDF/PMMA and ternary blends of PVDF/PMMA/PVAc. The PMMA and the combination of PMMA/PVAc serve the same role as PVAc in the blends as has been previously described. An advantage of adding PMMA is that the critical temperature can be increased arbitrarily to about 80° C. and the room temperature modulus can also be increased. The PVDF may be substituted by poly(vinylidene chloride) (PVDC), by copolymers of poly(vinylidene chloride/poly(vinyl chloride), or by any "C" polymer vide supra.

It has further been found that blending or mixing poly (vinyl chloride) with poly(butyl acrylate) or poly (butyl methacrylate) (PVC/PBA) has certain advantages. In the PVDF/PVAc case, PVAc simultaneously lowers the crystallinity of PVDF while increasing the $T_g$. PVC may serve the same role as PVDF, but it already has a low degree of crystallinity, but a relatively high $T_g$(~80° C.). Thus, in this exemplary embodiment of the present disclosure, the second component (PBA) serves only the function or role of decreasing $T_g$. This function/role can also be achieved with small molecule plasticizers, most notably dioctylphthalate (DOP), but it is presently preferred to use a biocompatible polymeric plasticizer for intended implantable medical applications. The range of PBA compositions is 10-40%, with 20% being the most advantageous, yielding a $T_g$~40° C.

Further advantageous features and functions associated with the polymer blends of the present disclosure will be apparent from the detailed description which follows.

DETAILED DESCRIPTION OF EXEMPLARY EMBODIMENTS

Figure 1:
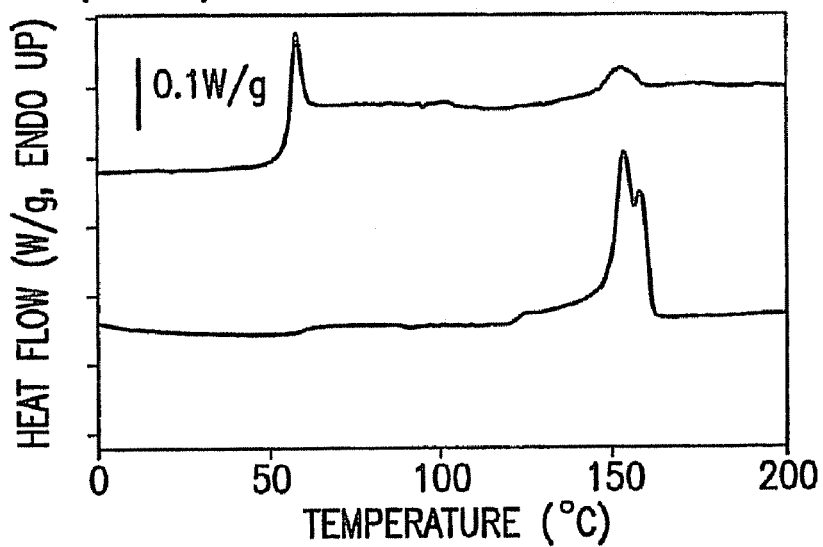
FIG. 1 illustrates a comparison of the DSC traces of PLA (top) quenched from T==180° C. or annealed at T=110° C. for one (1) hour (bottom)

Miscible blends of the present disclosure show or exhibit sharp and tunable transition temperatures and adjustable stiffness above their transition temperatures. The disclosed blends also show/exhibit excellent shape recovery effect with the recovery temperature and retracting force that is adjustable according to the transition temperature of the amorphous polymer and the degree of crystallinity of the homopolymers, respectively. The shape recovery can be finished within seconds when heated to an appropriate level above the transition temperature, e.g., 20° C. above the transition temperature. Additional advantages associated with the materials of the present disclosure include that the materials are rigid at room temperature, the polymers generally are biocompatible and can be used as medical devices and implants, and the products also can be dyed to any color or rendered radio-opaque for x-ray radiography according to application requirements.

The shape recovery temperatures of particular polymer blends according to the present disclosure depend on the glass transition of the blends. Theoretically, the blended polymer will recover above the glass transition temperature and below the melting temperature. Temperatures that are on the order of 20° C. above the glass transition temperature are preferably used to make the shape recovery fast. More preferably a temperature in the rubbery plateau region for the particular polymer blend is selected in order to have a fast recovery and a predictable and desired retracting force.

Blends of the present disclosure may be successfully used in connection with a wide variety of applications including, without limitation, the following applications:
a) Stents, patches and other implants for human health care.
b) Surgical tools requiring adjustable shape but high stiffness.

c) Arbitrarily shape-adjustable structural implements, including personal care items (dinnerware, brushes, etc.) and hardware tool handles.
d) Self healing plastics.
e) Medical devices.
f) Impression material for molding, duplication, rapid prototyping, dentistry, and figure-printing.
g) Toys.
h) Reversible embossing for information storage.
i) Temperature sensors
j) Safety valves
k) Heat shrink tapes or seals
l) Heat controlled couplings and fasteners.
m) Large strain, large force actuators

EXAMPLES

To further illustrate advantageous features, functions and uses of exemplary polymer blends according to the present disclosure, the following non-limiting examples are provided. As will be readily apparent to persons of skill in the art, the following examples are merely illustrative of aspects of the present disclosure, and should not be viewed as absolute and thus should not be considered to be limiting with respect to potential polymeric materials, processing conditions (e.g., relative percentages, temperatures and time periods) and/or end-use applications that may be advantageously employed according to the present disclosure. Physical properties and processing conditions set forth in the following examples are merely illustrative of such properties/conditions, and should not be viewed as limiting the scope or utility of the present disclosure.

Materials

Poly(vinyl acetate) having $M_w$=500,000 g/mol was purchased from Aldrich and vacuum-treated at room temperature for 2 days to eliminate volatiles, including moisture. The poly(lactide) having $M_w$=130,000 g/mol was provided by Prof. S. Huang of the University of Connecticut and was dried at T=60° C. overnight before use. The material was found to comprise 92% L-isomer and 8% D-isomer. Poly(vinylidene fluoride) having a $M_w$=180,000 g/mol was also purchased from Aldrich and vacuum-treated at room temperature for 2 days to eliminate volatiles, including moisture.

Processing and Fixing the Primary Shapes

Melt blending of PLA/PVAc and PVDF/PVAc using varying blend ratios was performed in a 30 ml Brabender twin-screw mixer. The mixer was equilibrated at T=180° C. for 5 minutes after which the mixer blade rotation was adjusted to 25 RPM and the premixed polymer pellets added to the chamber over the course of 1 minute. The polymers were mixed for 10 minutes to ensure good dispersion. Nitrogen was purged through the chamber to mitigate potential oxidative degradation during mixing. After mixing, the blend was taken out of the chamber, cooled to room temperature, and then pressed between heated platens of a Carver press at 180° C. for 5 minutes under a load of 8 metric tons. A spacer was used to control the thickness of the film and rapid cooling to room temperature was carried out. The films thus formed were used for thermal and mechanical characterization.

Characterizations

The thermal properties (thermogravimetric analysis (TGA)) of the polymers were measured preceding differential scanning calorimetry (DSC) measurements and melt blending to ensure that no solvent vapor was present in the polymers. For this purpose, a TA Instruments (TA 2950) TGA was used with samples of the polymers heated from 25° C. to 600° C. at a heating rate of 20° C./minute in a nitrogen atmosphere. A Perkin-Elmer DSC-7 was used for DSC analysis. Ten (10) mg samples prepared from pellets and heat pressed films were first heated from 20° C. to 200° C. at a heating rate of 10° C./minute (1$^{st}$ heat), then cooled to 20° C. at the same rate, and finally the samples were reheated to 200° C. at a heating rate of 10° C./minute (2$^{nd}$ heat). The $T_g$ of each blend was determined from the midpoint of heat capacity change observed during 2$^{nd}$ heating.

Wide-angle x-ray scattering (WAXS) analysis was performed using a BRUKER GADDS-4 instrument with a Cr source of radiation ($\lambda$=2.291 Å) and in transmission mode. The voltage and the current used were 40 kV and 40 mA, respectively, and the exposure time was 30 minutes. The scattering patterns were collected on a HiStar area detector with a sample-to-detector distance of 6.0 cm. Intensity profiles (I versus 2$\theta$) were determined by azimuthal averaging at each 2$\theta$ position of the isotropic patterns. The data were then analyzed with Peakfit™ software (SPSS Science) to find the peak positions and the relative intensity of each peak.

The storage and loss tensile moduli of the blends were measured by dynamic mechanical thermal analysis (DMTA) in tensile mode using TA Instruments DMA2980. The method used followed a temperature ramp spanning −100° C. <T<150° C. at a heating rate of 4° C./minute, a fixed oscillation frequency of 1 Hz, and a maximum tensile strain of about 0.5%. The sample geometries were rectangular bars of dimensions 10×2×1 mm.

Isothermal stress-free shape recovery tests were carried out using samples cut into a rectangular shape, stained for optical contrast, and then heated to T=65° C. for bending into a temporary helical shape. The deformed sample was fixed by cooling in ice water, thus vitrifying the sample. The resulting deformed sample was subsequently dropped into a warm water bath at a predetermined temperature and the shape recovery monitored visually with a video camera and digital frame-grabber collecting images at a rate of 20 frames-per-second.

Results

The TGA results demonstrated that both PLA and PVAc are stable for T<300° C. Above this temperature, PLA degrades completely (no char yield), while the PVAc degrades to yield an intermediate char yield of 25 wt % for 375<T<425° C., but complete degradation occurs above 450° C. Blend processing and thermal and dynamic mechanical analyses (DSC and DMA) were performed below 250° C., to completely avoid degradation.

The crystallization behavior of semicrystalline PLA was investigated via DSC. The PLA samples were first heat pressed at 180° C. for 10 minutes and then quenched to room temperature with water cooling. One sample was directly analyzed by DSC, while another was first annealed at 110° C. (=½($T_g$+$T_m$)) for 1 hour to reach an equilibrium level of crystallinity. FIG. 1 shows a comparison of thermal behavior for these two samples. It was observed that quenching the PLA melt results in a low degree of crystallinity and virtually no recrystallization on heating, both indicating slow crystallization. Annealing at 110° C. for 1 hour results in significant crystallization evidenced by a large melting endotherm at T=155° C. The melting temperature did not shift dramatically due to annealing, but the endotherm shape did change. Complementary WAXD experiments yielded the same conclusions.

Figure 2:
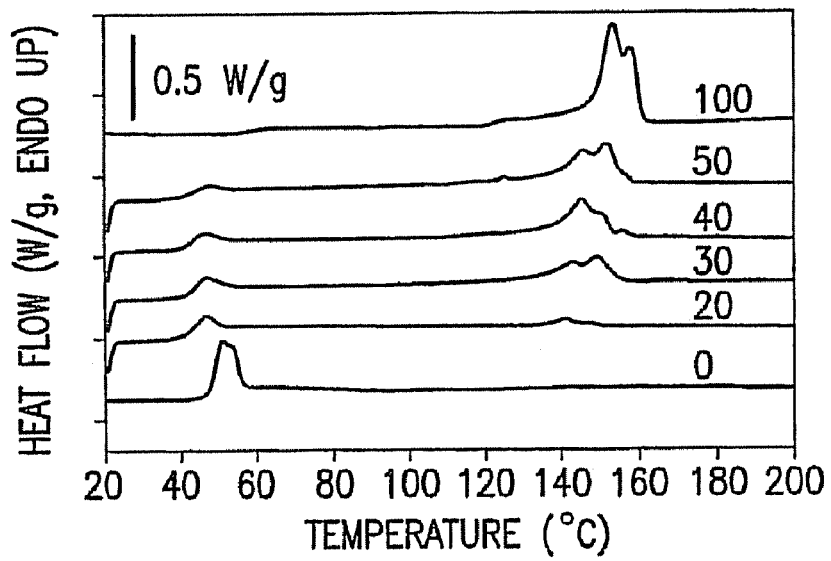
FIG. 2 illustrates DSC traces for PLA/PVAc blends following annealing for one (1) hour at T=110° C.
Figure 3:
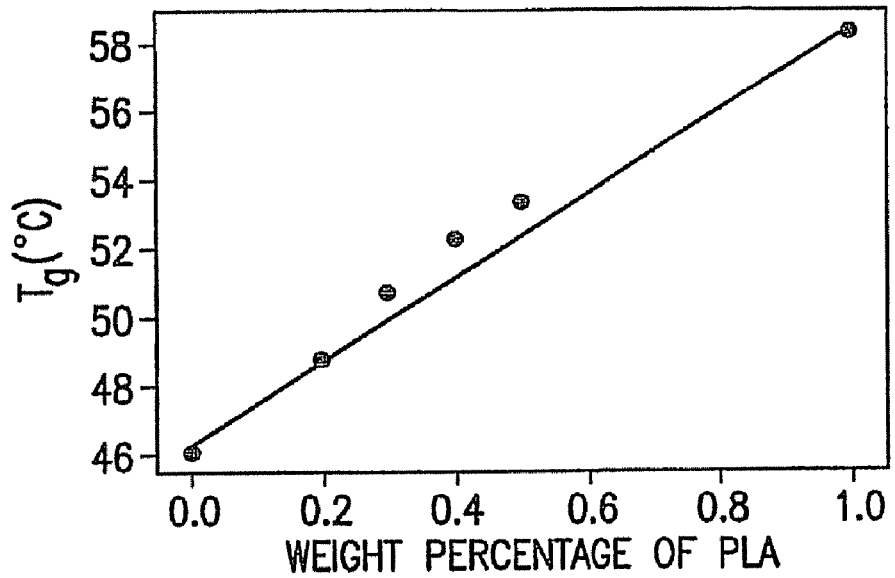
FIG. 3 illustrates glass transition temperatures as measured following quenching of the PLA/PVAc blends.

The crystallization behavior of polymer blends was also analyzed. All of the samples were heat pressed at 180° C. for 10 minutes and then annealed at 110° C. for 1 hour before thermal analysis, providing a standard condition for extensive crystallization. FIG. 2 summarizes the first DSC heating trace of the samples measured after annealing. The results indicate that PVAc itself is amorphous (though with large physical aging content), but that incorporation of PLA leads to crystallization in proportion to the PLA wt-%. Also, the peak endotherm positions (melting transitions) shift slightly to higher temperatures with increasing PLA content. Quenching these samples to T=20° C. and reheating to 200° C. again showed clearly that single $T_g$'s are observed and that crystallization can be largely suppressed. Importantly for shape memory, the single glass transition events were not broadened in the blends relative to the pure components, suggesting that the amorphous phase was quite homogeneous for all of the blends. The observed $T_g$ values are plotted in FIG. 3 along with the best fit with the Fox equation, showing slight positive deviation. This leads to a conclusion that strong interactions between the two polymers that reduces free volume of the polymer blends and hence, increased glass transition temperature relative to the Fox equation prediction, has occurred.

In order to elucidate the effect of PVAc on the degree of crystallinity and the crystal structures, the crystalline diffraction patterns were observed via wide-angle x-ray diffraction. The results indicate that the PVAc phase has only an amorphous halo, thus being totally amorphous, while the PLA exhibits three very strong diffraction peaks at $2\theta=22.3°$, 25.0° and 28.6°, corresponding to d-spacings of 5.92, 5.29, and 4.64 A°, respectively. Upon addition of PVAc, all of the peak intensities were depressed, but the peak positions remained essentially unchanged. Consistent with the DSC results, the degree of crystallinity increases in proportion to PLA addition. From the peak width at half height, it was found that the crystalline lamellae size did not decrease, although the degree of crystallinity decreased, with increasing PVAc content. This means that the decrease in crystallinity and depression of the melting transitions are not due to a change of crystal size, but rather may be due to a thinning of the lamellae thickness or to a decrease of the crystal concentrations.

Figure 4:
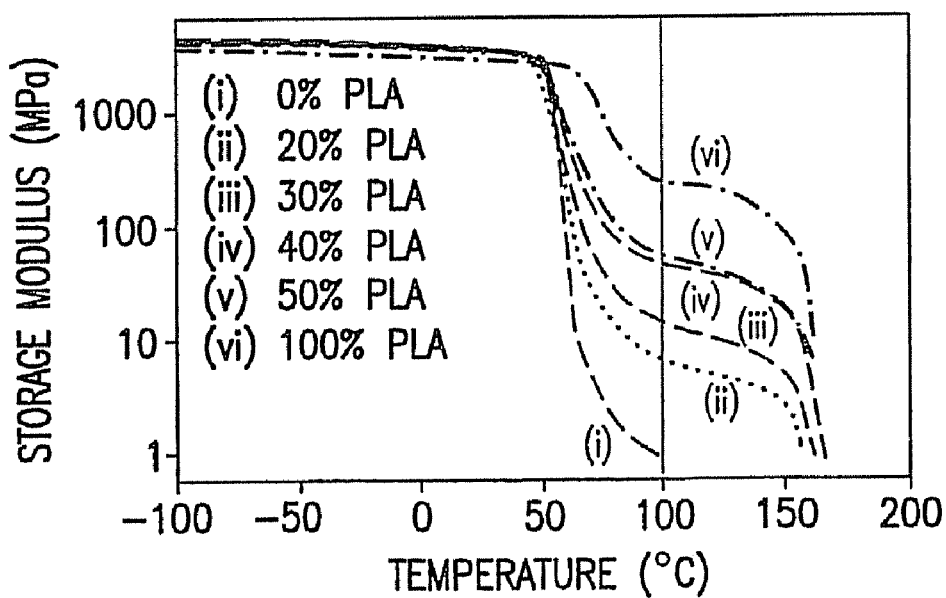
FIG. 4 illustrates tensile storage modulus versus temperature for a range of PLA/PVAc.

The storage modulus of the polymer blends was also measured using DMTA, first investigating the effects of annealing on the storage modulus. Below their glass transition temperatures, $T_g$, both samples exhibit similar high storage moduli (3 GPa), as well as similar softening points. When heated above $T_g$, the storage modulus of thermally quenched samples decreases sharply to about 2 MPa. However, further increasing the temperature induces a modulus increase attributed to recrystallization of the samples at higher temperatures. This also proved that the sample is not in an equilibrium state and that its mechanical properties in the rubbery region depend on thermal history. To reach equilibrium, the sample was annealed at 110° C. for 1 hour as previously described for DSC analyses. The storage modulus above $T_g$ shifts to about 200 MPa until melting, the increase being due to an increase of the degree of crystallinity on annealing. In order to tune the rubbery modulus at equilibrium state, PLA was blended in different proportions to PVAc and annealed as above. Storage moduli for such blends were measured and the results are plotted in FIG. 4. It can be seen that, below $T_g$, all of the samples show similar large moduli while above $T_g$ the moduli decrease to a plateau whose magnitude depends on crystallinity and thus PLA content. This trend is in accordance with that of DSC and XRD, and may be explained by the fact that the increase of storage moduli came from the physical crosslinking formed by crystals and the filler effect of the high modulus crystalline phase.

Figure 5:
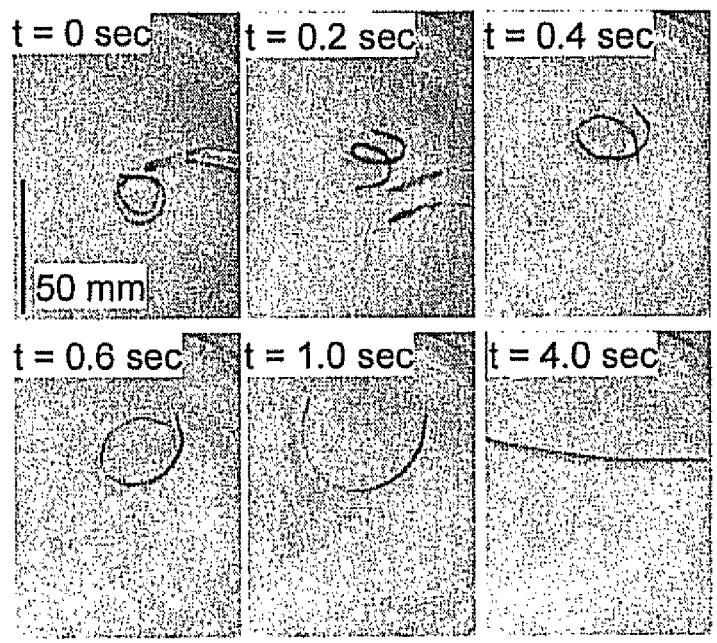
FIG. 5 illustrates shape recovery of coiled PLA/PVAc (30:70) blend on exposure to water at T=65° C.

Stress-free shape memory tests were carried out in hot water at 65° C., with an annealed sample composed of 30% PLA. The real time shape recovery was videotaped and selected images are shown in FIG. 5. The results show that the sample features quick and complete shape memory behavior: the sample recovers to the original shape (straight bar) within 10 seconds, with most of the recovery being accomplished within the first several seconds.

The same characterizations were carried out on the blends of PVDF and PVAc as above described. The TGA and DSC results show that PVDF is also thermally stable up to 300° C., and the mixtures form only one glass transition, the values fall between the Tgs of the two homopolymers and changes with changing composition. At the same time, the melting points and the degrees of crystallinity were depressed with the incorporation of amorphous PVAc.

The storage moduli of the blends, which give the rigidity of the materials, were also measured. The results are similar to those of the PLA/PVAc blends, the PVDF/PVAc blends being very rigid below the critical temperatures ($T_g$), and featuring sharp modulus changes at the Tg to a plateau modulus ranging from several MPa to tens of MPa, depending on the degree of crystallinity of the blends. These plateau moduli can be tuned by adjusting the degree of crystallinity of the blend, that is, by adjusting the blend composition.

In summary, shape memory polymers were obtained by blending a semicrystalline polymer, for example, PLA, with an amorphous polymer, for example PVAc. The polymer blends are totally miscible at all blend ratios within the experimental ranges and form only one single glass transition temperature for each formulation. Additionally, the degree of crystallinity of the blends decreases monotonically with increasing PVAc and PVAc and PVDF fraction. This, in turn, governs the rubbery modulus important to shape memory.

Thus, the present disclosure advantageously provides a shape memory polymeric material that is characterized by a $T_g$ exceeding room temperature whose rubber modulus and elasticity are derived substantially from physical crosslinks comprising a blend of a crystalline polymer selected from the group consisting of poly(vinylidene fluoride),polyglycolides, polylactide and copolymers thereof, poly(hydroxybutyrate), poly(ethylene glycol), polyethylene, polyethylene-co-vinyl acetate, poly(vinyl chloride), poly(vinylidene chloride) and copolymers of poly vinylidene chloride and poly vinyl chloride with an amorphous polymer selected from the group consisting of poly(vinyl acetate), poly methyl acrylate, poly ethyl acrylate, atactic poly methyl methacrylate, isotactic poly methyl methacrylate and syndiotactic poly methyl methacrylate.

The present disclosure also advantageously provides a method of preparing a shape memory polymer material characterized by a $T_g$ exceeding room temperature whose rubber modulus and elasticity is derived substantially from physical crosslinlcing comprising melt blending a crystalline polymer selected from the group consisting of poly (vinylidene fluoride), polylactide, poly(hydroxybutyrate), poly(ethylene glycol), polyethylene, polyethylene-co-vinyl acetate, poly(vinyl chloride), poly(vinylidene chloride) and copolymers of poly vinylidene chloride and poly vinyl chloride with an amorphous polymer selected from the group consisting of poly(vinyl acetate), poly methyl acrylate, poly ethyl acrylate, atactic poly methyl methacrylate, isotactic poly methyl methacrylate and syndiotactic poly methyl methacrylate at a temperature of 10~20° C. above the melting temperature of the crystalline polymers, for a time sufficient to ensure good mixing, cooling the resultant blend to room temperature, introducing said blend into a press maintained at about 180° C., applying pressure to said blend and then rapidly cooling the film thereby formed to an annealing temperature $T_g<T_a<T_m$, where it is held until crystallization is complete and following which the film is cooled to room temperature.

Although the polymer blends and processing methodologies of the present disclosure have been described with reference to specific exemplary embodiments thereof, the present disclosure is not to be limited to such exemplary embodiments. Rather, as will be readily apparent to persons skilled in the art, the teachings of the present disclosure are susceptible to many implementations and/or applications, without departing from either the spirit or the scope of the present disclosure. Indeed, modifications and/or changes in the selection of specific polymers, polymer ratios, processing conditions, and end-use applications are contemplated hereby, and such modifications and/or changes are encompassed within the scope of the present invention as set forth by the claims which follow.

What is claimed is:

1. Method of preparing a shape memory polymer material characterized by a $T_g$ exceeding room temperature whose rubber modulus and elasticity is derived substantially from physical crosslinking comprising melt blending
   a crystalline polymer selected from the group consisting of
   poly(vinylidene fluoride), polylactide, poly(hydroxybutyrate),
   poly(ethylene glycol), polyethylene, poly(ethylene-co-vinyl acetate),
   poly(vinyl chloride), poly(vinylidene chloride), and copolymers of
   vinylidene chloride and vinyl chloride with
   an amorphous polymer selected from the group consisting of poly(vinyl
   acetate), poly(methyl acrylate), poly(ethyl acrylate), and atactic
   poly(methyl methacrylate)
at a temperature of 10~20° C. above the melting temperature of the crystalline polymers, for a time sufficient to ensure good mixing,
   cooling the resultant blend to room temperature,
   introducing said blend into a press maintained at about 180° C.,
   applying pressure to said blend, and then
   rapidly cooling the film thereby formed to an annealing temperature $T_g<T_a<T_m$, where it is held until crystallization is complete and following which the film is cooled to room temperature.

2. Method according to claim 1 wherein said melt blending is carried out for from about 5 to about 10 minutes.

3. Method according to claim 1 wherein said blend is formed by melt blending amorphous poly(vinyl acetate) and crystalline polylactide.

4. Method according to claim 1 wherein said blend is formed by melt blending amorphous poly(vinyl acetate) and semicrystalline poly(vinylidene fluoride).

* * * * *